US009792383B2

(12) United States Patent
Shah et al.

(10) Patent No.: US 9,792,383 B2
(45) Date of Patent: Oct. 17, 2017

(54) UNLOAD AND DISPLAY CONTENT PLACEHOLDERS WITH VERSIONS (71) Applicant: Google Inc., Mountain View, CA (US)

(72) Inventors: Roma Rajni Shah, San Francisco, CA (US); Alex Neely Ainslie, San Francisco, CA (US); Arnaud Claude Weber, Saratoga, CA (US); Angela Strange, San Francisco, CA (US)

(73) Assignee: Google Inc., Mountain View, CA (US)

( * ) Notice: Subject to any disclaimer, the term of this patent is extended or adjusted under 35 U.S.C. 154(b) by 519 days.

(21) Appl. No.: 13/712,939

(22) Filed: Dec. 12, 2012

(65) Prior Publication Data
US 2015/0205761 A1    Jul. 23, 2015

(51) Int. Cl.
G06F 17/30 (2006.01)
G06F 9/44 (2006.01)
G06F 3/01 (2006.01)
G06F 15/16 (2006.01)

(52) U.S. Cl.
CPC ...... G06F 17/30899 (2013.01); G06F 9/4443 (2013.01)

(58) Field of Classification Search
CPC ...... G06F 12/08; G06F 3/01; G06F 13/30905; G06F 13/30899; G06F 15/16; G06F 17/30889; G06F 9/4443
USPC .................................................. 715/234, 738
See application file for complete search history.

(56) References Cited

U.S. PATENT DOCUMENTS

| 6,339,780 | B1 | 1/2002 | Shell et al. |
| 6,744,452 | B1 | 6/2004 | McBrearty et al. |
| 6,766,352 | B1 | 7/2004 | McBrearty et al. |
| 7,194,506 | B1* | 3/2007 | White ............... G06F 17/30902 709/203 |
| 8,615,583 | B2 | 12/2013 | Plamondon |
| 2006/0041556 | A1* | 2/2006 | Taniguchi et al. ............. 707/10 |
| 2006/0155728 | A1* | 7/2006 | Bosarge ........... G06F 17/30876 |
| 2010/0011284 | A1* | 1/2010 | Ramakrishna et al. ...... 715/234 |
| 2010/0070570 | A1 | 3/2010 | Lepeska |
| 2011/0202847 | A1* | 8/2011 | Dimitrov ...................... 715/738 |
| 2012/0044137 | A1 | 2/2012 | Oddiraju et al. |
| 2012/0054440 | A1* | 3/2012 | Doig ................ G06F 17/30902 711/122 |
| 2013/0054514 | A1 | 2/2013 | Barrett-Kahn et al. |

(Continued)

OTHER PUBLICATIONS

Randy Connolly, "Core Internet Application Development with ASP.NET 2.0", ISBN 0-321-41950-2, first publication Feb. 2007 Attached file name: Prentice Hall Core Internet Applicationvelopment With Asp 2.0 Feb. 2007.*

(Continued)

Primary Examiner — Cesar Paula
Assistant Examiner — Jian Huang
(74) Attorney, Agent, or Firm — McDermott Will & Emery LLP (57) ABSTRACT Methods for displaying a placeholder for unloaded content while the unloaded content reloads are provided. In one aspect, a method includes receiving a request to display unloaded content, and providing, for display, a representation of the unloaded content while the unloaded content is loaded. The method also includes providing, for display, the loaded content. Systems and machine-readable media are also provided.

15 Claims, 7 Drawing Sheets (56) References Cited

U.S. PATENT DOCUMENTS

2013/0185643 A1* 7/2013 Greifeneder ............ H04L 67/22
　　　　　　　　　　　　　　　　　　　　　　　　　715/736
2014/0136971 A1　　5/2014　Kumar et al.

OTHER PUBLICATIONS

Mangukiya, Microsoft ASP.NET CodeProject, Screen Capture, Aug. 4, 2012 Attached file name: Screen Capture—CodeProject.pdf.*
RFC2616: https://web.archive.org/web/20000815054159/http://www.w3.org/Protocols/rfc2616/rfc2616sec14. html, published 2000.*
"Performance Considerations in Applications for Windows Phone", Windows Phone Dev Center, Sep. 25, 2012, retrieved from <http://msdn.microsoft.com/en-us/library/windowsphone/develop/ff967560%28v=vs.92%29.aspx>.

* cited by examiner

UNLOAD AND DISPLAY CONTENT PLACEHOLDERS WITH VERSIONS

BACKGROUND

Field

The present disclosure generally relates to the transmission of data over a network, and more particularly to the use of a computing device to communicate over a network.

Description of the Related Art

Mobile web browsers are commonly limited to loading a limited number of web page browsing windows (or "tabs") at a single time in memory for display due to constraints of the memory. Nonetheless, many such web browsers seek to create an illusion to a user that the user can open an unlimited number of tabs in the web browser. The illusion is often achieved by unloading old or unused tabs from memory while keeping a limited number of tabs loaded in memory for display. When the user selects a tab that has been unloaded, such web browsers commonly display a blank screen while attempting to reload the content of the unloaded tab for display.

SUMMARY

According to one embodiment of the present disclosure, a computer-implemented method for displaying a placeholder for unloaded content while the unloaded content reloads is provided. The method includes receiving a request to display unloaded content, and providing, for display, a representation of the unloaded content while the unloaded content is loaded. The method also includes providing, for display, the loaded content.

According to another embodiment of the present disclosure, a system for displaying a placeholder for unloaded content while the unloaded content reloads is provided. The system includes a memory that includes instructions, and a processor. The processor is configured to execute the instructions to receive a request to display unloaded content on a device and provide, for display, a representation of the unloaded content while the unloaded content is loaded. The processor is also configured to execute the instructions to provide, for display, the loaded content. The representation preserves at least one of a zoom level or a scrolling position of the content as previously displayed on the device, and the loaded content provided for display preserves at least one of a zoom level or a scrolling position of the content as previously displayed on the device.

According to a further embodiment of the present disclosure, a machine-readable storage medium that includes machine-readable instructions for causing a processor to execute a method for displaying a placeholder for unloaded content while the unloaded content reloads is provided. The method includes receiving a request to display unloaded content on a device, and providing, for display, a screen capture of the unloaded content while the unloaded content is loaded. The screen capture includes a visual representation of the content as previously displayed on the device. The method also includes determining whether the content includes information indicating the content requires reloading. When the content includes information indicating the content requires reloading, the method includes providing a visual indicator that the representation of the unloaded content is superseded. The method further includes providing, for display, the loaded content.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system presents an altered representation of unloaded content as a placeholder while the unloaded content is reloaded. The content can be, for example, a web page that has been unloaded from memory. The altered representation is provided for display in response to a user request to display the unloaded web page. The altered representation can be a screen capture of the web page as last viewed by a user in a first tab prior to another tab being displayed for another web page. The screen capture can, for example, preserve a zoom level and scrolling position of the web page as last viewed by the user prior to viewing the other tab. The altered representation of the web page can be, for example, a black-and-white version of the web page. The changed color of the screen capture provides an indication of which web page is being reloaded, while the reduced number of colors provides an indication that the web page is being reloaded. The reduced number of colors of the screen capture also saves memory space as compared to a color screen capture. An additional status bar can also be provided to indicate that the web page is being reloaded. If the web page being reloaded includes information indicating that the prior version of the web page that was displayed to the user has been superseded, then a visual indicator can be provided indicating that the prior version of the web page has been superseded. The visual indicator can be, for example, a white screen that is flashed after the altered representation is displayed and prior to the reload of the web page. After the web page is reloaded in the tab, the web page is zoomed and scrolled to the position at which the user was previously viewing the web page.

Although many examples provided herein describe a user's information being stored in memory (e.g., a screen capture of a web page being viewed), the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 1:
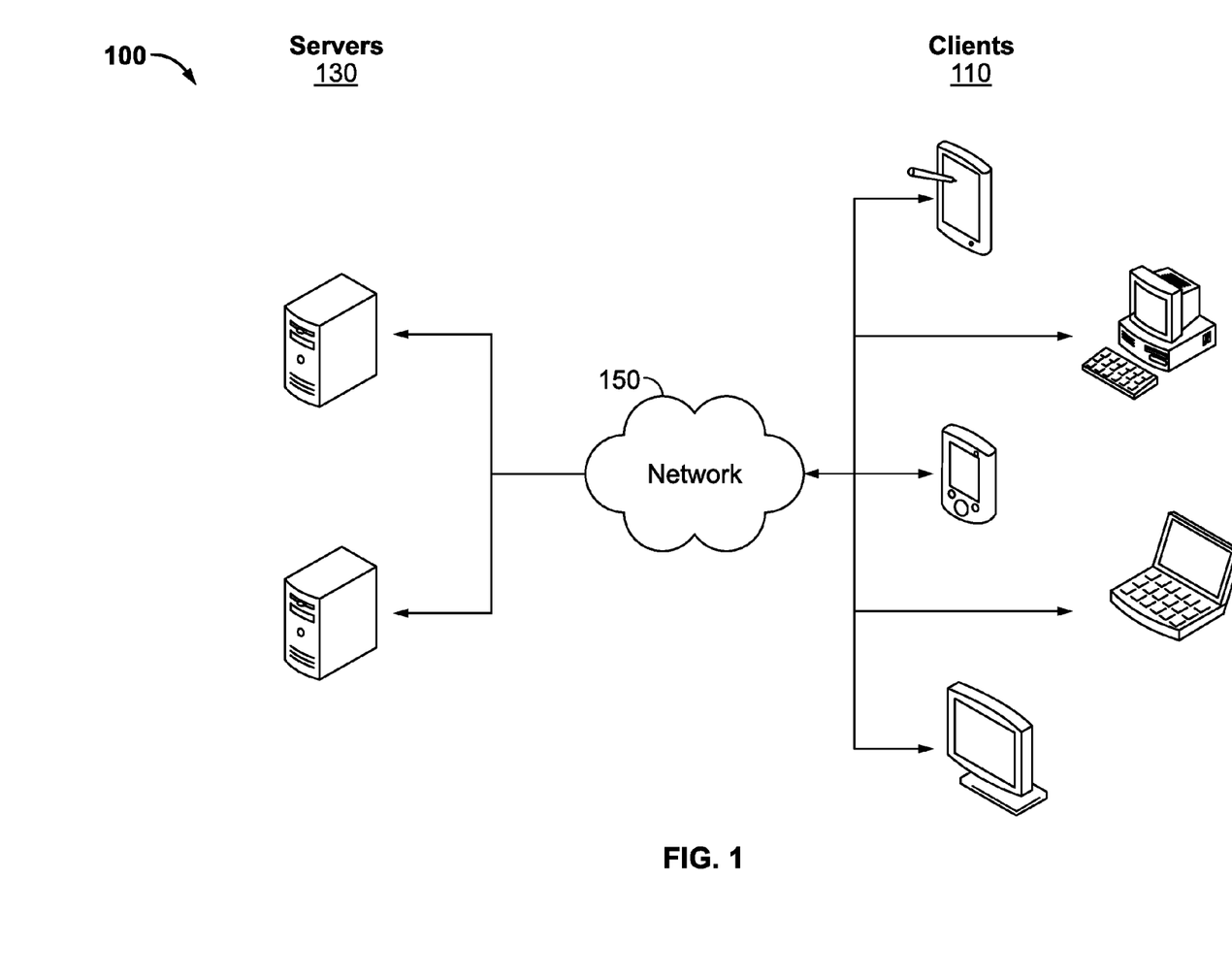
FIG. 1 illustrates an example architecture for displaying a placeholder for unloaded content while the unloaded content reloads.

FIG. 1 illustrates an example architecture 100 for displaying a placeholder for unloaded content while the unloaded content reloads. The architecture 100 includes servers 130 and clients 110 connected over a network 150.

Each of the many clients 130 is configured to include and execute an application for displaying content. The application can be, for example, a web browser, a document or text editing program, an image editing program, a video editing program, a gaming program, or any other program that displays content. The content can be, for example, a web page, a document, an image, a video, an audio file, a game, or other displayable content. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for displaying content.

In certain aspects, the content for display in the application can be obtained from one or many servers 130 over the network 150. The servers 130 can be any device having an appropriate processor, memory, and communications capability for hosting data encoder service. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The application on the client 110 is configured to load and display the content. The content can be loaded for display, for example, in response to a request from a user of a client 110 to display the content. If the user chooses to display other content, a representation (e.g., such as a screen capture) of the previous content that was displayed can be obtained and stored by the application on the client 110. If the user chooses to display the previous content again, but the previous content has since been unloaded from memory on the client 110, then the representation of the previous content can initially be displayed in the application (e.g., as a placeholder) while the previous content is again loaded for display.

Figure 2:
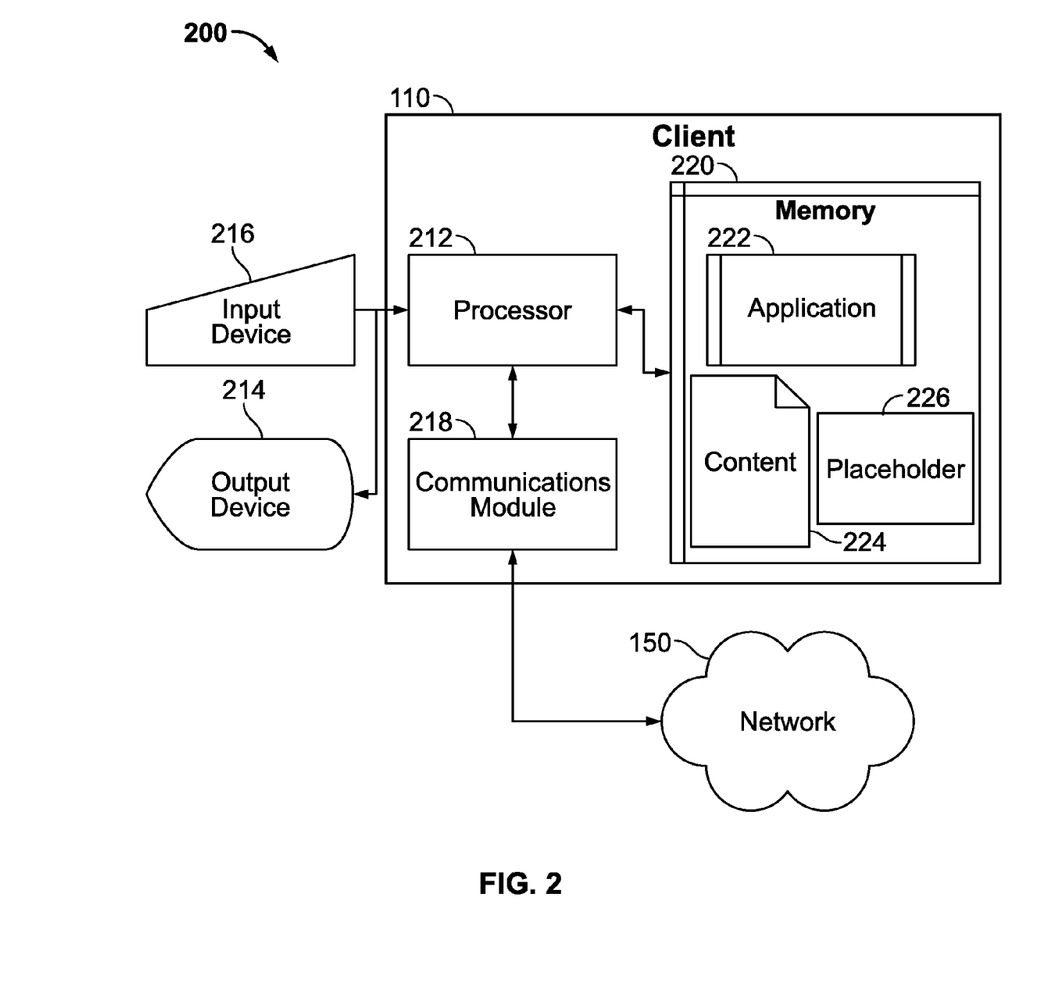
FIG. 2 is a block diagram illustrating the example client from the architecture of FIG. 1 according to certain aspects of the disclosure.

FIG. 2 is a block diagram 200 illustrating an example client 110 in the architecture 100 of FIG. 1 according to certain aspects of the disclosure. The client 110 is connected to the network 150 via a communications module 218. The communications module 218 is configured to interface with the network 150 to send and receive information, such as content, data, requests, responses, and commands to other devices on the network 150. The communications module 218 can be, for example, modems or Ethernet cards.

The client 110 includes a processor 212, the communications module 218, and a memory 220 that includes the application 222, content 224 and a placeholder 226 for the content 224 for display in the application. The client 110 also includes an input device 216, such as a keyboard or mouse, and an output device 214, such as a display. The content 224 is loaded in memory 220 when the content 224 is rendered and displayed on the output device 214. If the content 224 is unloaded from memory 220, for example, due to the content not currently being displayed or the content being old, then the content 224 is reloaded prior to being rendered and displayed on the output device 214.

The processor 212 of the client 110 is configured to execute instructions, such as instructions physically coded into the processor 212, instructions received from software in memory 240, or a combination of both. For example, the processor 212 of the client 110 executes instructions to display the placeholder 226 for the unloaded content 224 while the unloaded content 224 reloads into memory 220 for display in the application 222 on the output device 110. Specifically, the processor 212 of the client 110 executes instructions from the application 222 causing the processor 212 to receiving a request to display content 224 that has been unloaded. The content 224 was previously loaded into memory 220 and displayed on the client 110, but is later unloaded from memory 220 due to, for example, a lack of use by the application 222 of displaying the content 224.

The processor 212 of the client 110 also executes instructions to provide, for display (e.g., on the output device 214), a representation or "placeholder" 226 of the unloaded content 224 while the unloaded content 224 is loaded. The placeholder 226 for the unloaded content can be, for example, a screen capture (a.k.a., "screen dump," "screencap," "screenshot," "screen grab," or "print screen") that includes visible items of the unloaded content displayed on the output device 214.

The placeholder 226 is obtained according to various approaches, including, for example, sending a request to an operating system on the client 110 to obtain the placeholder 226, directly capturing the screen using the application 222, or intercepting a video output of the output device 214. The placeholder 226 can be obtained when a request to display other content is received by the client 110 while the content is displayed on the client 110 prior to the content 224 being unloaded. For example, if the application 222 is a web browser, and the content 224 to be displayed by the web browser are web pages, an initial web page can be displayed in a first tabbed window of a web browser, and when a subsequent web page is displayed in a second tabbed window of the web browser that is overlaid on the first tabbed window such that the web page of the first tabbed window is not visible, a placeholder 226 of the initial web page as displayed by the web browser can be obtained. As the initial web page is no longer being displayed by the web browser, the rendering and display of the initial web page can be removed from memory 220 after a certain predetermined time limit. If subsequently a request is received to display the unloaded initial web page in first tabbed window, a placeholder 226 of the initial web page can be displayed by the web browser while the initial web page is reloaded for rendering and display.

The placeholder 226 includes a visual representation of the content 224 as previously displayed by the application 222 on the client 110. If a portion of the content 224 (e.g., a subset of a webpage) was displayed by the application 222, then that same portion of the content 224 is included in the placeholder 226. For example, the placeholder 226 can be a substantially identical image capture of the content 224 (or portion of content 224) as previously displayed by the application 222. The visual representation of the content 224 for the placeholder 226 can be altered slightly from the original content 224 in order to indicate that the web page is being reloaded. For example, the visual representation of the content 224 can be an interpretation of the content 224 as previously displayed, such as a blurred graphical version of the content 224 as previously displayed, a black-and-white graphical version of the content 224 as previously displayed if the content 224 was displayed in color, a shaded or in-shadow graphical version of the content 224 as previously displayed, or a reduced resolution version of the content 224 as previously displayed. By reducing a number of colors of the placeholder 226 as compared to the content 224, less memory space is needed for storing the placeholder 226 in memory 220.

The placeholder 226 can preserve a zoom level of the content 224 as previously displayed on the device, a scrolling position of the content 224 as previously displayed on the device, or both. For example, if the content 224 was zoomed to double its original size, and further scrolled down to view a middle portion of the content, then the zoom setting and scrolling position would be maintained in the placeholder 226.

The processor 212 of the client 110 further executes instructions to provide, for display, the content 224 after it is loaded. For example, after the content 224 is unloaded, if the client 110 receives a request to display the content 224, then the content is loaded again for rendering and display. The loaded content 224 can preserve a zoom level of the content 224 as previously displayed on the client 110, a scrolling position of the content 224 as previously displayed on the client 110, or both.

In certain aspects, the processor 212 of the client 110 is configured to determine whether the content 224 includes information indicating that the content 224 requires reloading. When the content 224 includes information indicating that the content 224 requires reloading, the processor 212 of the client 110 is configured to provide a visual indicator that the representation of the unloaded content is superseded and requires reloading. The visual indicator that the representation of the unloaded content 224 is superseded can be, for example, a flashing screen, a specific color displayed on a majority of the display of the output device 214, or an image, icon, or audio indicating that the unloaded content 224 is superseded. Thus, a display of a screen capture or other placeholder 226 of the unloaded content 224 can be followed by a flashing screen indicating the unloaded content 224 has been superseded, and then the content 224 can be reloaded in order to provide content that is most current. In addition to the display of the placeholder 226 and the visual indicator, a status bar can also be displayed to indicate a status of the loading of the content 224 in the application 222.

Figure 3:
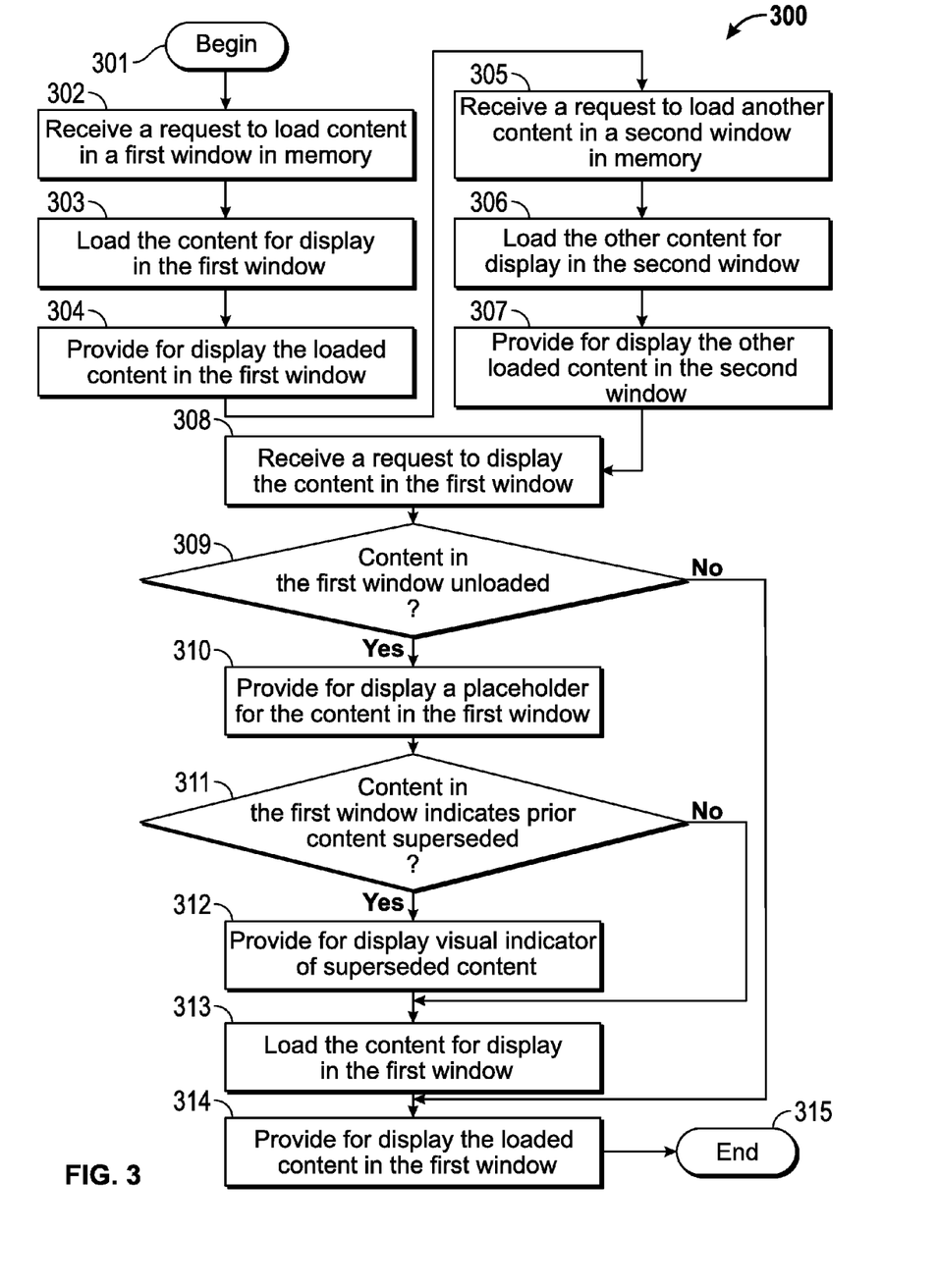
FIG. 3 illustrates an example process for displaying a placeholder for unloaded content while the unloaded content reloads using an example client of FIG. 2.

FIG. 3 illustrates an example process 300 for displaying a placeholder for unloaded content while the unloaded content reloads using the example client 110 of FIG. 2. While FIG. 3 is described with reference to FIG. 2, it should be noted that the process steps of FIG. 3 may be performed by other systems.

The process 300 begins by proceeding from beginning step 301 when an application 222 is loaded on a client 110 to step 302 when the application 222 receives a request to load, in memory 220, content 224 in a first window of the application 222. In step 303, the content 224 is loaded for display in the first window, and in step 304 the loaded content 224 is provided for display in the first window. In step 305, the application 222 receives a request to load, in memory 220, other content in a second window of the application 222. In step 306, the other content is loaded for display in the second window, and in step 307 the loaded other content is provided for display in the second window. Subsequently, in step 308, a request is received to display the content 224 in the first window. A determination is made in decision step 309 as to whether the content 224 of the first window has been unloaded. If the content 224 of the first window is determined to be unloaded, the process 300 proceeds to step 310, otherwise the process 300 proceeds to step 314.

In step 310, a placeholder 226 for the content 224 of the first window is provided for display in the application 222. In decision step 311, a determination is made whether the content 224 of the first window represented by the placeholder 226 has been superseded. If the content 224 of the first window represented by the placeholder 226 has been superseded, then the process 300 proceeds to step 312 in which a visual indicator of the superseded content is provided for display in the application 222. The process 300 continues on from step 312 to step 313. Otherwise, if in decision step 311 it is determined that the content 224 of the first window represented by the placeholder 226 has not been superseded, then the process 300 proceeds to step 313.

In step 313, the content 224 is loaded for display in the first window. In step 314, the loaded content is provided for display in the first window. The process 300 then ends in step 315.

FIG. 3 set forth an example process 300 for displaying a placeholder for unloaded content while the unloaded content reloads using the example client 110 of FIG. 2. An example will now be described using the example process 300 of FIG. 3, a client 110 that is a smartphone, an application 222 that is a mobile web browser, content 224 that is a web page, and a placeholder 226 that is a screen capture of the web page.

Figure 4A:
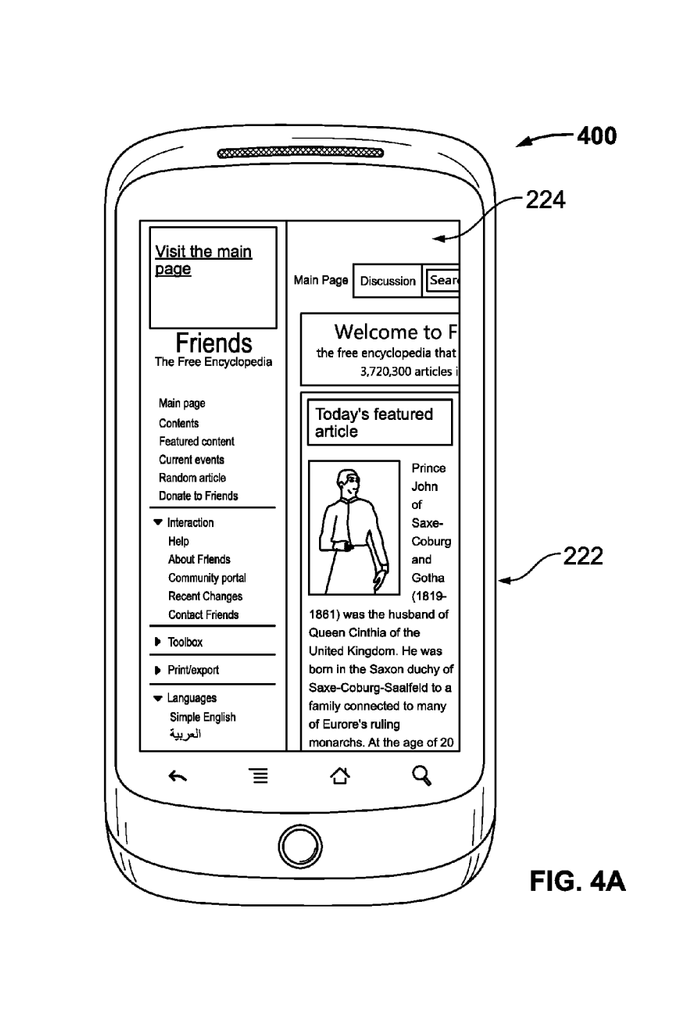
FIGS. 4A-4E are example illustrations associated with the example process of FIG. 3.

The process 300 begins by proceeding from beginning step 301 when the web browser 222 is loaded on the smartphone 110 to step 302 when the web browser 222 receives a request to load, in memory 220, a web page 224 in a first tab window of the web browser 222. In step 303, the web page 224 is loaded for display in the first tab window, and in step 304 the loaded web page 224 is provided for display in the first tab window. FIG. 4A provides an example illustration 400 of the web page 224 being displayed in the first tab window of the web browser. The web page 224 includes color content.

Figure 4B:
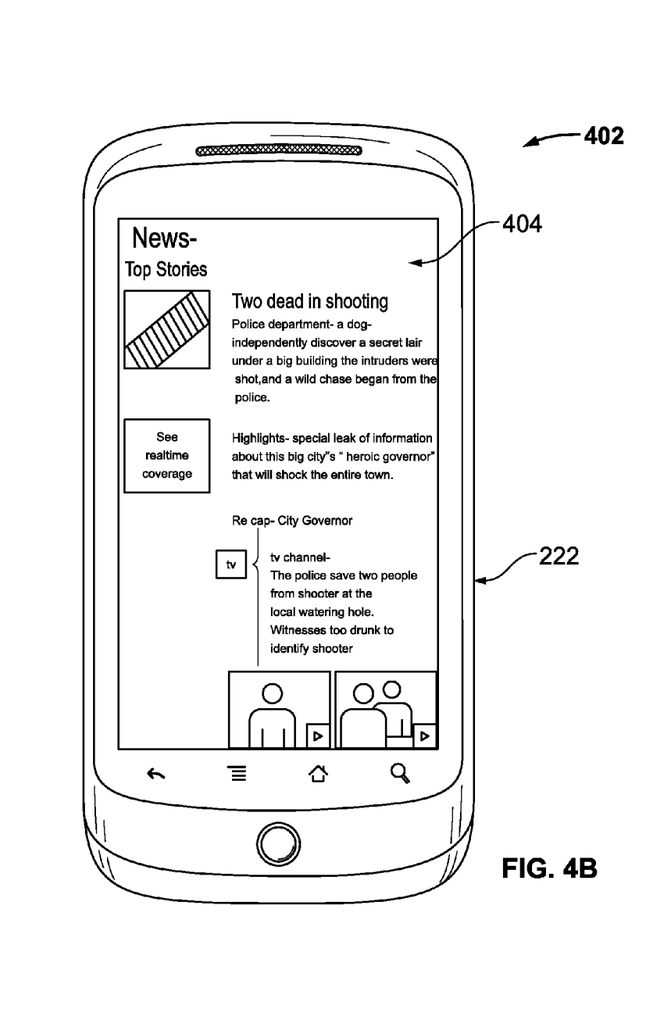

In step 305, the web browser 222 receives a request to load, in memory 220, another web page 404 in a second tab window of the web browser 222. In step 306, the other web page 404 is loaded for display in the second tab window, and in step 307 the loaded other web page is provided for display in the second tab window. FIG. 4B provides an example illustration 402 of the other web page 404 being displayed in the second tab window of the web browser 222.

Figure 4C:
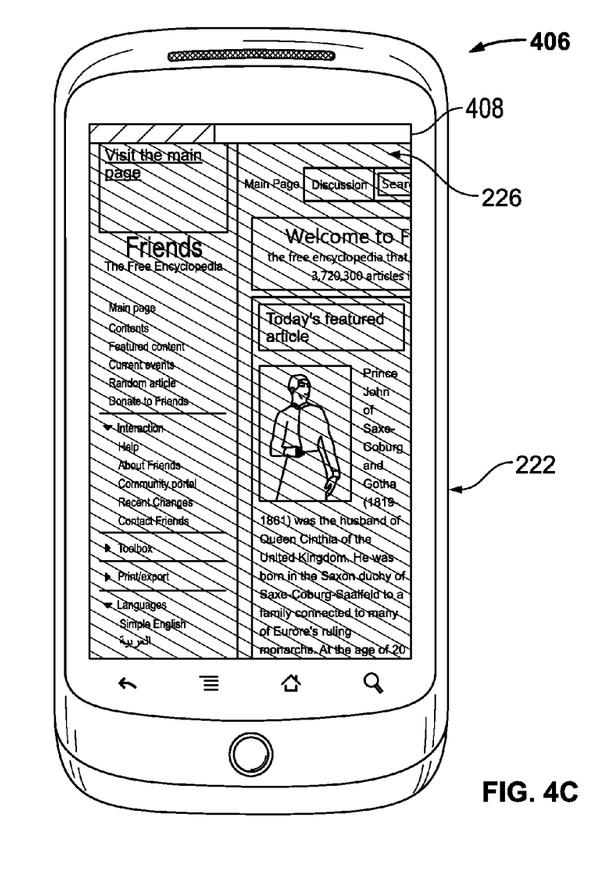

Subsequently, in step 308, a request is received to display the web page 224 in the first tab window. For example, a user of the smartphone 110 can provide an input indicating the user would like to view the first tab window. A determination is made in decision step 309 that the web page 224 of the first tab window has been unloaded. The process 300 proceeds to step 310, in which a screen capture placeholder 226 for the web page 224 of the first window is provided for display in the web browser 222. FIG. 4C provides an example illustration 406 of the screen capture 226 of the web page 224 being displayed in the first tab window of the web browser 222. The screen capture 226 is a black-and-white (illustrated in shading in FIG. 4C) representation of the web page 224 illustrated in FIG. 4A. The web browser 222 also includes a display of a loading status bar 408 that indicates the web page 224 is being reloaded.

Figure 4D:
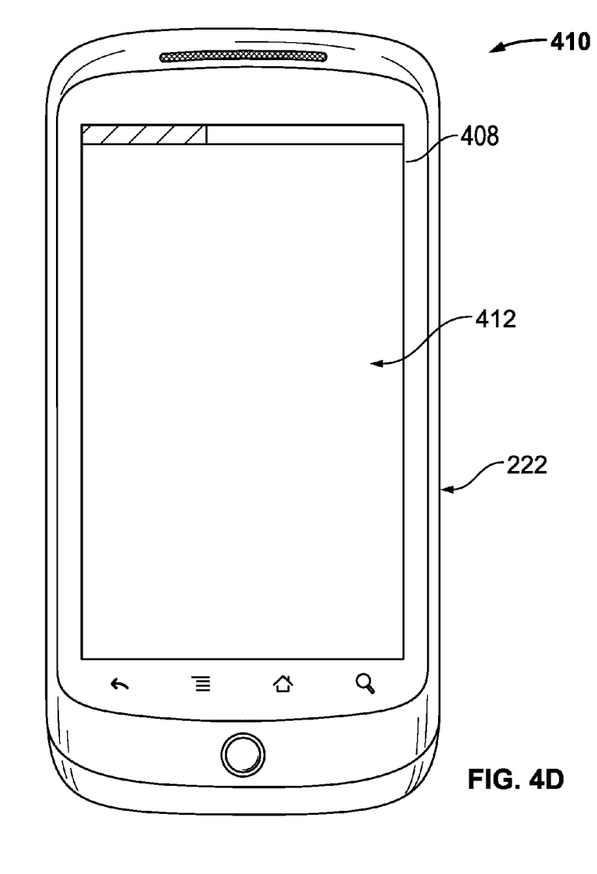

In decision step 311, a determination is made that the web page 224 of the first window represented by the placeholder 226 has been superseded. In the example, the web page 224 is determined to have new content for display based on metadata included in the web page 224. For example, the metadata can be an HTML tag (e.g., <META HTTP-EQUIV="EXPIRES" CONTENT=[DATE/TIME]>) in the web page 224 that indicates the web page 224 has expired. The process 300 proceeds to step 312 in which a visual indicator of the superseded web page, namely a flashing white screen, is provided for display in the web browser 222. FIG. 4D provides an example illustration 410 of the flashing white screen 412 being displayed in the first tab window of the web browser 222 as the web page 224 reloads. The web browser 222 also includes the display of a loading status bar 408 that indicates the web page 224 is being reloaded as the screen flashes white once.

Figure 4E:
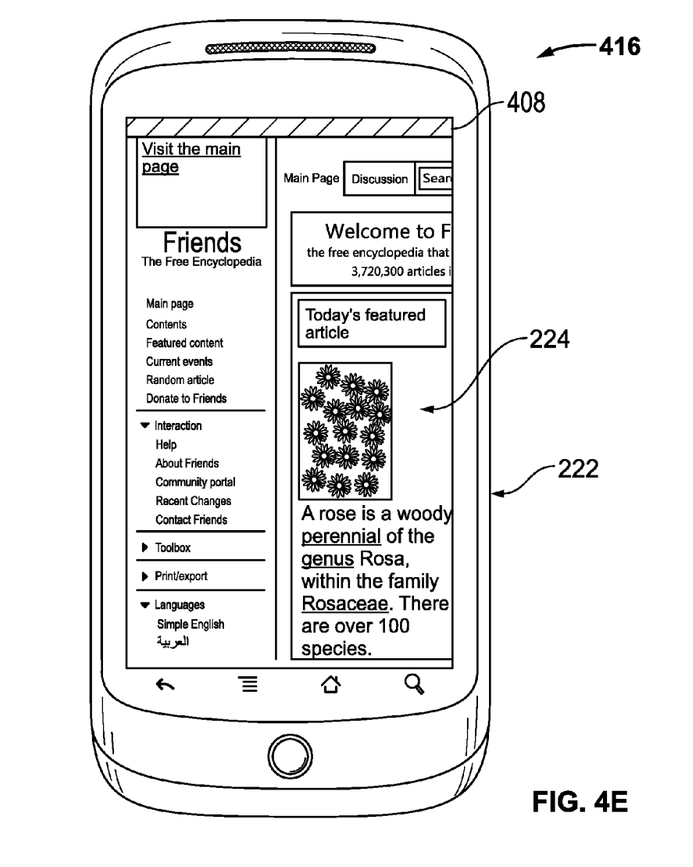

Next, in step 313, the web page 224 is loaded for display in the first tab window. In step 314, the loaded web page is provided for display in the first tab window. FIG. 4E provides an example illustration 416 of the reloaded web page 224 being displayed in the first tab window of the web browser 222. The web page 224 illustrated in FIG. 4E includes new content that supersedes the content of the web page 224 as illustrated in FIG. 4A. The process 300 then ends in step 315.

Figure 5:
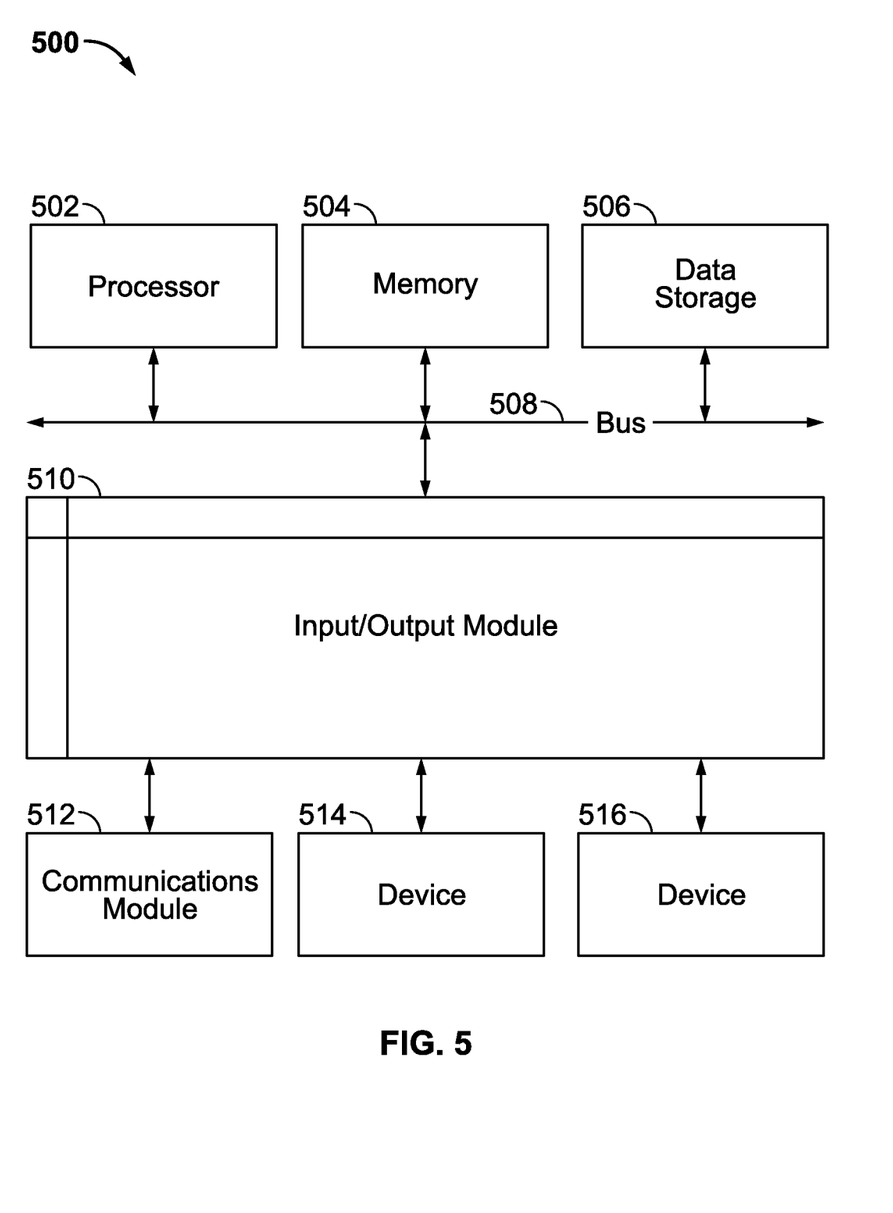
FIG. 5 is a block diagram illustrating an example computer system with which the client of FIG. 2 can be implemented.

FIG. 5 is a block diagram illustrating an example computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for providing a placeholder for unloaded content have been described. When a user requests to view on a device content that has been unloaded from memory, a placeholder for the content as previously displayed on the device is provided for display while the content is reloaded into memory. The placeholder can be, for example, black-and-white screenshot of the content as previously displayed on the device. Once the content is loaded into memory, the content is provided for display.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for displaying a placeholder for unloaded content while the unloaded content reloads, the method comprising:
    determining, on a device, that a display of a first version of content within a viewport of the device has become hidden by a display of overlapping content within the viewport;
    after determining that the first version has become hidden, unloading the first version from a memory of the device;
    responsive to the display of the first version being hidden by the display of the overlapping content and being unloaded from the memory, obtaining a representation of the content;
    receiving a request to view on the device the display of the first version of content that was hidden and unloaded from the device, wherein the first version of the content was previously loaded and displayed on the device with a zoom level and a scrolling position;
    responsive to the request, loading a second version of the content and providing, for display on the device, the obtained representation of the first version while the second version is loaded, the obtained representation of the first version being displayed at the zoom level and the scrolling position; and
    providing, for display on the device, the second version of the content.

2. The computer-implemented method of claim 1, wherein the representation of the first version of the content comprises a screen capture of the first version of the content.

3. The computer-implemented method of claim 1, wherein the second version of the content provided for display preserves at least one of the zoom level or the scrolling position of the first version of the content as previously displayed on the device.

4. The computer-implemented method of claim 2, wherein a portion of the first version of the content was previously displayed within the viewport of the device, and wherein the screen capture of the first version of the content is limited to the portion of the first version of the content previously displayed within the viewport.

5. The computer-implemented method of claim 2, wherein the content is configured for display in color, and wherein the screen capture of the first version of the content comprises a black-and-white representation of the first version of the content.

6. The computer-implemented method of claim 2, wherein the screen capture of the first version of the content is obtained when a request to display other content is received while the first version of the content is displayed on the device prior to the content being unloaded.

7. The computer-implemented method of claim 6, wherein the content and the other content comprise web pages, wherein the web page was previously displayed in a first tabbed window of a web browser, wherein the other web page is provided for display in a second tabbed window of the web browser, and wherein the request to view the display of the unloaded web page is for the first tabbed window of the web browser.

8. The computer-implemented method of claim 1, further comprising:
    determining that the first version is superseded by the second version before loading the second version;
    displaying a visual indicator that indicates the first version was superseded by the second version, wherein the visual indicator comprises a flashing screen.

9. A system for displaying a placeholder for unloaded content while the unloaded content reloads, the system comprising:
    a memory comprising instructions;
    a processor configured to execute the instructions to:
        determine, on a device, that a display of a first version of content within a viewport of the device has become hidden by a display of overlapping content within the viewport;
        after determining that the first version has become hidden, unload the first version from a memory of the device;
        responsive to the display of the first version being hidden by the display of the overlapping content and being unloaded from the memory, obtain a representation of the content;
        receive a request to view on the device the display of the first version of content that was hidden and unloaded from the device, wherein the first version of the content was previously loaded and displayed on the device with a zoom level and a scrolling position;
        responsive to the request, load a second version of the content and provide, for display on the device, the obtained representation of the first version while the second version is loaded, the obtained representation of the first version being displayed at the zoom level and the scrolling position; and provide, for display on the device, the second version of the content.

10. The system of claim 9, wherein the representation of the first version of the content comprises a screen capture of the first version of the content.

11. The system of claim 10, wherein a portion of the first version of the content was previously displayed within the viewport of the device, and wherein the screen capture is limited to the portion of the first version of the content previously displayed within the viewport.

12. The system of claim 10, wherein the content is configured for display in color, and wherein the screen capture of the first version of the content comprises a black-and-white representation of the first version of the content.

13. The system of claim 10, wherein the screen capture is obtained when the request to view the display of the first version of the content is received.

14. The system of claim 13, wherein the content and the other content comprise web pages, wherein the web page was previously displayed in a first tabbed window of a web browser, wherein the other web page is provided for display in a second tabbed window of the web browser, and wherein the request to view the display of the unloaded web page is for the first tabbed window of the web browser.

15. A non-transitory machine-readable storage medium comprising machine-readable instructions for causing a processor to execute a method for displaying a placeholder for unloaded content while the unloaded content reloads, the method comprising, comprising:

determining, on a device, that a display of a first version of content within a viewport of the device has become hidden by a display of overlapping content within the viewport of the device;

after determining that the first version has become hidden, unloading the first version from a memory of the device;

responsive to the display of the first version being hidden by the display of the overlapping content and being unloaded from the memory, obtaining a screen capture of the first version of the content;

receiving a request to view on the device the display of the device a first version of content that was hidden and unloaded from the device, wherein the first version of the content was previously loaded and displayed on the device with a zoom level and a scrolling position;

responsive to the request, loading a second version of the content and providing, for display on the device, the obtained screen capture of the first version while the second version is loaded, the obtained screen capture of the first version being displayed at the zoom level and the scrolling position; and     providing, for display on the device, the second version of the content.

* * * * *